(No Model.)
H. T. HERMANN.
JEWEL BOX.
No. 443,094. Patented Dec. 23, 1890.
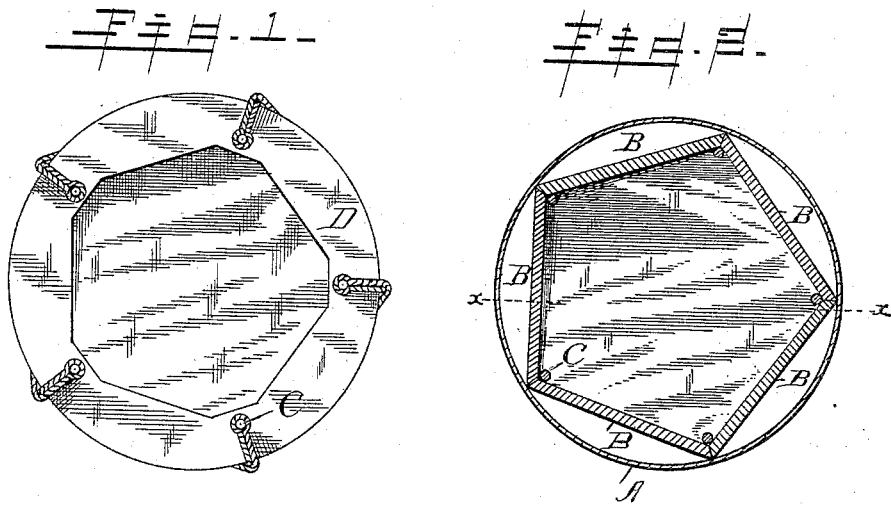
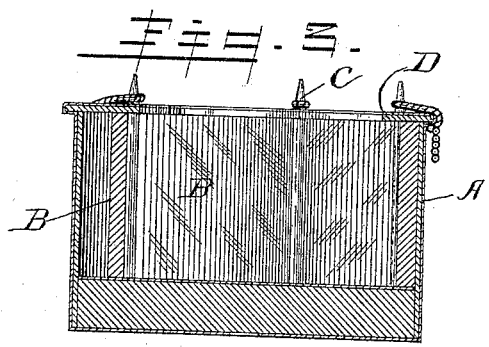
Witnesses
Jos H Blackwood
A. B. Blackwood
Inventor
Henry T. Hermann
By his Attorneys
Smith & Clapp

UNITED STATES PATENT OFFICE.

HENRY T. HERMANN, OF ANTIGO, WISCONSIN.

JEWEL-BOX.

SPECIFICATION forming part of Letters Patent No. 443,094, dated December 23, 1890.

Application filed November 14, 1889. Serial No. 330,328. (No model.)

*To all whom it may concern:*

Be it known that I, HENRY T. HERMANN, a citizen of the United States, residing at Antigo, in the county of Langlade and State of Wisconsin, have invented certain new and useful Improvements in Jewel-Boxes; and I do declare the following to be a full, clear, and exact description of the invention, such as will enable others skilled in the art to which it appertains to make and use the same.

My invention relates to certain new and useful improvements in jewel-boxes; and the nature of the invention will be understood from the following description, when taken in connection with the accompanying drawings, in which latter—

Figure 1 is a top plan of the box; Fig. 2, a horizontal section therethrough, and Fig. 3 a vertical section.

In the drawings, A represents the box, the outer surface of which, as shown in the drawings, is round, but which may be of any desired form. The box is made of any suitable material, and, if desired, may be covered with silk, plush, or any other ornamental material. The inner wall of the box consists of a series of mirrors B, which are arranged, as shown, at angles to each other, these mirrors being held in place by pins or bolts C, which are inserted at their lower ends into the bottom of the box, and at their upper ends pass up through a ledge or inwardly-projecting rim D, with which the box is formed. I provide one of these pins for each angle formed by two of the mirrors.

Pins C may be made of ornamental metal, if desired.

I have shown a box provided with five mirrors, but any suitable number may be employed. The box may also be provided with a cover, if desired.

What I claim is—

The improved jewel-box herein described and shown, consisting of the casing having a horizontal inwardly-projecting ledge in its top, a series of mirrors arranged within the casing and extending entirely around the same, and the series of pins arranged in the angles of the mirrors and having their lower ends inserted into the bottom of the casing and their upper ends projecting through the ledge at the top of the casing, as set forth.

In testimony whereof I affix my signature in presence of two witnesses.

HENRY T. HERMANN.

Witnesses:
W. F. WHITE,
IRA SMITH.